UNITED STATES PATENT OFFICE.

EMIL FRANKE, OF GRÜNAU, NEAR BERLIN, GERMANY, ASSIGNOR TO CHEMISCHE FABRIK GRÜNAU LANDSHOFF AND MEYER AKTIENGESELLSCHAFT, OF GRÜNAU, GERMANY.

ALIZARIN PREPARATION AND PROCESS OF MAKING.

965,804.

Specification of Letters Patent. Patented July 26, 1910.

No Drawing. Application filed July 9, 1909. Serial No. 506,776.

*To all whom it may concern:*

Be it known that I, EMIL FRANKE, chemist, a subject of the German Emperor, residing at Grünau, near Berlin, Germany, have invented certain new and useful Improvements Relating to Alizarin Preparations Suitable for Dyeing and Printing, of which the following is a specification.

Experiments made for converting alizarin-sodium into alizarin and sodium formate by treatment with carbonic acid, have shown, that this operation cannot be carried through successfully. The final product is a liquid, which has a very weak alkaline reaction, absorbs carbonic acid very slowly and contains in addition to sodium formate, alizarin-sodium and alizarin in solution. This solution may be boiled down to dryness, without causing the separation of free alizarin. By the addition of water the dry substance may be re-dissolved.

Experiments have shown, that mordanted cotton may be dyed with the solution. The product obtained as described is a new alizarin preparation rich in alizarin soluble in water and capable of dyeing cotton in the same manner as commercial alizarin in the shape of paste. Further experiments have shown, that alizarin may be caused to enter into solution also by caustic soda solution corresponding in quantity to the monosodium salt, and that with this solution cotton may be dyed as with the alizarin paste. These dyes had a more bluish tint than that obtainable with the same kind of alizarin without the addition of soda lye. Fuller tints may however be obtained, as shown by experiments, by adding sodium formate equivalent in quantity to the sodium lye. The sodium formate may be replaced by the sodium-acetate or by the sodium salts of tartaric acid, lactic acid or similar organic acids, or by the sodium salts of weak inorganic acids, such as boracic acid. A monosodium salt of alizarin soluble in water may therefore be obtained by the addition of the quantity of sodium or potassium lye corresponding to this salt of alizarin and by boiling down to dryness in the presence or without the presence of alkali salts of organic acids or weak inorganic acids, may be converted into a concentrated dry alizarin preparation.

As regards solubility and coloring power the alizarin preparations to which salts of sodium or potassium have been added are superior to the pure monosodium or monopotassium-alizarins.

The manufacture may be modified by first producing the disodium-salt of alizarin and then forming the monosodium salt by addition of acid. Preparations obtained in this manner are distinguished by their easy solubility. The above described treatment of alizarin may be applied also to purpurin and isopurpurin.

The commercial advantages of the dry preparations in comparison with the pastes usually formed in commerce are firstly the great concentration (more than 70 per cent. of alizarin) facilitating transportation, and secondly the easy solubility, which insures a much better distribution of alizarin in the bath, than is possible with the best paste. Further advantages are the facility of weighing off predetermined quantities of the dry powder, the avoidance of the liability to dry up, which is very troublesome in the case of pastes, and after which an equally fine distribution cannot be obtained, and the strength of the paste is not accurately known. Further advantages appear in the utilization of these preparations in the process of printing inasmuch as the impressions penetrate better, and are therefore more permanent, and the printing rollers are not liable to be smudged.

In localities, where the cost of transportation of alizarin in the shape of paste is not important in comparison with the cost of production of the dry alizarin, it may be possible with an alizarin solution produced in the manner described, to work more cheaply than with the dry alizarin preparation, and that the color effect will be equally advantageous. In comparison with the alizarin in the shape of paste the dyer has the great commercial advantage of being able to dye with the alizarin solution in the apparatus.

What I claim is:—

1. The process for obtaining alizarin preparations suitable for dyeing and printing, which consists in dissolving alizarin by means of an alkali solution not exceeding in quantity that corresponding to the mono-alkali-salt of alizarin, substantially as described.

2. The process for obtaining alizarin preparations suitable for dyeing and printing, which consists in dissolving alizarin by means of an alkali-solution not exceeding in quantity that corresponding to the mono-alkali-salt of alizarin and adding alkali salts of organic acids substantially as described.

3. The process for obtaining dry soluble and concentrated alizarin preparations suitable for dyeing and printing which consists in forming a solution of alizarin by means of alkali-solution in quantity not exceeding that corresponding to the mono-alkali-salt of alizarin, and boiling down the solution to dryness, substantially as described.

4. The process for obtaining dry soluble and concentrated alizarin preparations suitable for dyeing and printing, which consists in forming a solution of alizarin by means of an alkali-solution in quantity not exceeding that corresponding to the mono-alkali-salt of alizarin, adding alkali salts of organic acids and evaporating to dryness, substantially as described.

5. An alizarin preparation formed by dissolving alizarin in a quantity of alkali-lye corresponding in quantity to the mono-alkali salt of alizarin, the said preparation unlike the normal sodium salt of alizarin being capable of dyeing mordanted cotton, and being less soluble in water than the disodium salt, substantially as described.

6. A dry and concentrated alizarin preparation soluble in water and consisting of a mixture of alizarin and a mono-alkali-salt of alizarin and a salt of an organic acid, the said mono-alkali salt of alizarin, unlike the normal di-alkali-salt of alizarin, being capable of dyeing mordanted cotton and being less soluble in water than the disodium salt, substantially as described.

In testimony whereof I have hereunto set my hand in presence of two subscribing witnesses.

EMIL FRANKE.

Witnesses:
PAUL JHCYO,
WALTER SAECHSLING.